United States Patent
Luijten

(10) Patent No.: US 6,674,716 B1
(45) Date of Patent: Jan. 6, 2004

(54) CELL COMPLIANCE DECISION METHOD AND APPARATUS

(75) Inventor: Ronald P. Luijten, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/381,058

(22) PCT Filed: Jan. 16, 1998

(86) PCT No.: PCT/IB98/00062

§ 371 (c)(1),
(2), (4) Date: Sep. 13, 1999

(87) PCT Pub. No.: WO99/37065

PCT Pub. Date: Jul. 22, 1999

(51) Int. Cl.[7] .................................................. H04J 3/14
(52) U.S. Cl. ........................ 370/230; 370/235; 370/238
(58) Field of Search ................................ 370/229, 230, 370/233, 234, 235, 235.1, 236.1, 395.1, 253, 231, 238, 247, 252, 395.4

(56) References Cited

U.S. PATENT DOCUMENTS

| 5,666,353 A | * | 9/1997 | Klausmeier et al. | ........ 370/230 |
| 5,668,797 A |   | 9/1997 | Fahmi et al.      |                  |
| 5,930,234 A | * | 7/1999 | Yoshida           | ........ 370/232 |
| 6,072,776 A | * | 6/2000 | Takamichi         | ........ 370/235 |
| 6,108,303 A | * | 8/2000 | Fahmi et al.      | ........ 370/230 |

FOREIGN PATENT DOCUMENTS

| EP | 0 790 723 A2 | 11/1996 |
| JP | 4-281644     | 10/1992 |
| JP | 5-136806     | 6/1993  |
| JP | 5-183570     | 7/1993  |
| JP | 5-252191     | 9/1993  |
| JP | 8-51426      | 2/1996  |
| JP | 8-116324     | 5/1996  |
| JP | 9-83515      | 3/1997  |
| JP | 10-117195    | 5/1998  |
| JP | 10-164088    | 6/1998  |

OTHER PUBLICATIONS

Toyoshima, et al., "A study on VP traffic shaper for ATM based Networks—A Proposal of CDV Reduction Shaping Algorithm—" Proceedings of Electronic Information Comm. Association CS93–136, pp. 23–29, Nov. 1993.

1995 Electronic Information Comm. Association, Proceedings of the 1995 IEICE General Conference, Mar. 27–30, 1995.

* cited by examiner

Primary Examiner—Dang Ton
Assistant Examiner—Phuc Tran
(74) Attorney, Agent, or Firm—Scully, Scott, Murphy & Presser; Gail H. Zarick, Esq.

(57) ABSTRACT

A method for deciding over the compliance of cells at an input of a switch. The time is counted with a time-counting device with a predetermined maximum counting range for determining the points in time of the arrival of the cells. The reading of the time-counting device is used to determine for a first arriving cell a first arrival time and for a second arriving cell a second arrival time. The second arrival time is compared with a theoretical arrival time for the second cell. The theoretical arrival time is calculated using the first arrival time and a predetermined value of an interarrival period. The number of wraps of the time-counting device is counted. The reading of a wrap-counting device at the second arrival time and at the theoretical arrival time is used to determine whether to use the comparison for deciding whether to consider the second arriving cell compliant or non-compliant or whether to consider the second arriving cell compliant or non-compliant without performing the comparison.

14 Claims, 3 Drawing Sheets

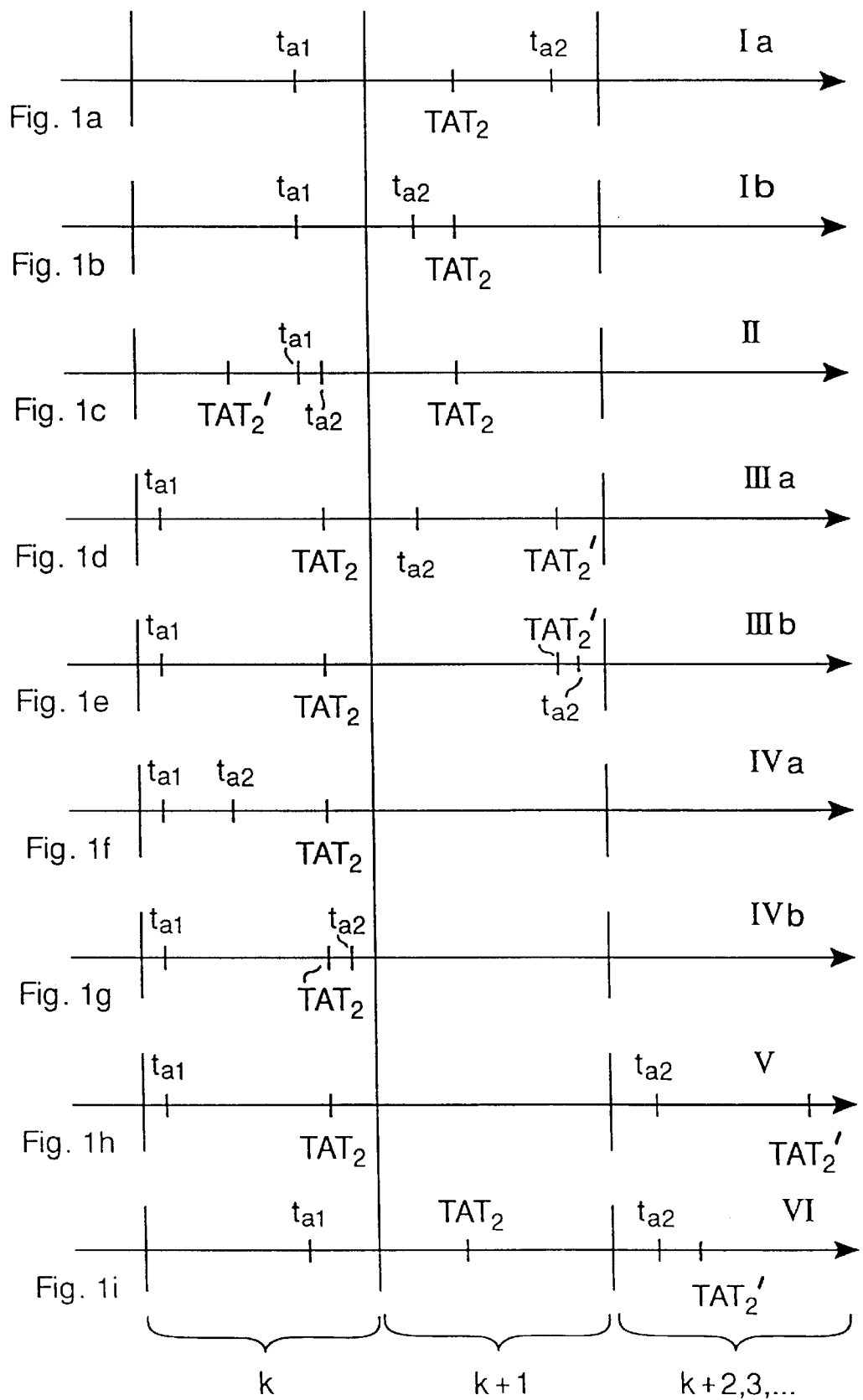

| | | $TAT_2$ | |
|---|---|---|---|
| | | k | k+1 |
| $t_{a2}$ | k | ca:                IV<br>if v = 1<br>  then comp $(t_{a2}, TAT_2$ & C)<br>  else cc<br><br>v := 1<br>$t_{a1} := t_{a2}$<br>$TAT_2 := t_{a1} + T$<br>--------<br>bp: ∅ | ca:                II<br>if v = 1<br>  then comp $(t_{a2}, TAT_2$ & C)<br>  else cc<br><br>v := 1     C := ∅<br>$t_{a1} := t_{a2}$<br>$TAT_2 := t_{a1} + T$<br>--------<br>bp: ∅ |
| | k+1 | ca:               III<br>  cc<br>v := 1<br>$t_{a1} := t_{a2}$<br>$TAT_2 := t_{a1} + T$<br>--------<br>bp:    v := ∅ | ca:                I<br>  C := ∅<br>if v = 1<br>  then comp $(t_{a2}, TAT_2$ & C)<br>  else cc<br><br>v := 1<br>$t_{a1} := t_{a2}$<br>$TAT_2 := t_{a1} + T$<br>--------<br>bp:    C := ∅ |
| | $\underbrace{k+1+n}_{k-n}$ | ca:               V<br>  cc<br>v := 1<br>$t_{a1} := t_{a2}$<br>$TAT_2 := t_{a1} + T$<br>--------<br>bp:    v := ∅ | ca:               VI<br>  cc<br>v := 1<br>$t_{a1} := t_{a2}$<br>$TAT_2 := t_{a1} + T$<br>--------<br>bp:    v := ∅ |

Fig. 2

CELL COMPLIANCE DECISION METHOD AND APPARATUS

BACKGROUND OF THE INVENTION

1. Technical Field

A method and an apparatus for deciding on the compliance of cells at an input port of a switch is used to determine whether cells arriving at a switching device have to be considered compliant or non-compliant which result is useable as a basis for the decision whether that cell shall be discarded or may be accepted.

2. Prior Art

In the field of transportation of information via fixed-length cells, switches are used which connect a plurality of incoming connection lines to a plurality of output connection lines in that they forward cells arriving on the incoming connection lines to the output connection line to which said cells are heading. Since such switches are limited in their capacity to handle cells without cell loss, each incoming line is assigned a maximum cell deliverance rate, also called allocated bandwidth. As long as all senders stay within the limit defined by the respective allocated bandwidth, the switch is designed to handle the cells without risk of loss of information. For correct function, a mechanism is used to determine for each connection the currently used bandwidth. If a sender exceeds its bandwidth limit, e.g. a control signal may be sent upstream to the sender to make him throttle his output cell speed. The correct determination of the currently used bandwidth is hence important for guaranteeing quality of service for all connections. Known mechanisms use a time counter which is used as basis for the determination of the arrival time of incoming cells. A theoretical arrival time is calculated for a next cell expected to arrive on the same connection line as a preceding cell. A generic cell rate algorithm, short GCRA, is then performed which compares the arrival time of this next cell with its theoretical arrival time, also called TAT. The GCRA generally performs two actions: Upon arrival of a cell it decides whether an arriving cell is considered compliant or non-compliant and it afterwards calculates the new theoretical arrival time TAT. The known principles of GCRAs are described in the ITU Recommendation I.3711 of the ITU Telecommunication Standardization Sector, March 1995. The GCRA is also known as the leaky-bucket algorithm which exists in various modifications. An overview over the leaky-bucket principle can be found on the Internet the address http://www-kr.cisco.com/univercd/data/doc/lightstr/r2_2/sys_over/traffic.htm.

In U.S. Pat. No. 5,418,777 a modified leaky-bucket method is disclosed for a message transmission system wherein a message cell stream is asynchronously transmitted and is carrying message cells for a plurality of virtual connections. The message cell rate for every virtual connection is being monitored, the shortest allowable timing between two message cells belonging to the same virtual connection being represented by the quotient of two numbers.

U.S. Pat. No. 5,224,092 describes a method for controlling a flow of data cells into a plurality of asynchronously time-divided transmission channels with a single admission switch for transmission in the channels with reference to the state of a plurality of count values. Therein the incrementation or decrementation of a number of variables is used, which variables are processed to produce a number of assessment signals which are then converted by further processing into a control signal that is used to accept or not accept data cells. Another thereto pertinent patent is U.S. Pat. No. 5,224,091 which is related to a method for monitoring a transmission system which comprises a plurality of virtual asynchronously time-shared transmission channels via which a data flow can be transmitted.

U.S. Pat. No. 5,509,001 describes an apparatus for controlling cells which are to be input to an ATM switch. The apparatus includes a periodic calculation circuit for periodically changing the number of cells for each of different calls and a control part for determining whether the cell stored in a buffer circuit should be output to the ATM switch or discarded.

An accounting system and method for an asynchronous transfer mode network is described in U.S. Pat. No. 5,623405.

A problem arises due to the fact that the counting range of such counters is in real hardware always limited. When reaching the highest possible reading, the counter therefore wraps to its lowest reading and starts counting again. Therefore, counter readings after a counter wrap are lower than some counter readings before. This leads to cell mishandling and mistreatment of senders. More precisely, the time counter wrap can lead to situations where cells are considered compliant although they are non-compliant and also to cells being considered non-compliant although they should be considered as compliant. With other words, if the time counter has a wrap either while waiting for a cell or before the next TAT, the GCRA result may be wrong.

It is an object of the invention to provide an apparatus and also to provide a method which avoids the above disadvantage in that it is designed to determine correctly the actually used bandwidth on connection lines on which cells are arriving. This is achieved in that the wraps of the time-counting means are monitored to determine whether a wrap occurred, the result of that determination being useful for deciding whether the theoretical arrival time has a valid value to be compared with the arrival time of an arriving cell.

In the dependent claims additional improvements and variations of the apparatus and of the method are contained therein.

A second comparison means for comparing the reading of the wrap-counting means at the first arrival time with the reading of the wrap-counting means at the second arrival time is a practical and simple solution for finding out the difference in the number of windows in which the first and the second cell arrived. This difference is an important variable for correctly determining the used bandwidth on that connection.

For easily finding out the number of the window in which the theoretical arrival time lies, the reading of the wrap-counting means at the theoretical arrival time can be used.

A practical solution for keeping the memory of the arrival times is to store the reading of the time-counting means at the second arrival time and at the first arrival time. When the storing places are arranged in form of a shift register, upon arrival of a new cell, the storage of the new arrival time will automatically effect the conversion of the arrival time of the previous cell which up to then has been the second arrival time, to the then valid first arrival time. This automatism is very simple and therefore needs not much dedicated logic.

State-determination means can be used to initiate on a timely regular basis with a predetermined repetition period a process which effects an artificial second arrival time for which the reading of the wrap-counting means is determined. This reading together with the reading of the wrap-counting means at the theoretical arrival time is usable for the determination whether a wrap occurred between the theoretical arrival time and the artificial second arrival time. This is a background process which even leads to correct cell-handling when the wrap-counting means has a wrap itself. The result of the background process can be used for setting a validity flag which indicates if the theoretical arrival time is valid for the next arriving cell or not.

For obtaining the maximum precision of the cell rate determination process, the repetition period should be chosen at maximum the time between two wraps of the time-counting means multiplied with the maximum reading of the wrap-counting means minus 2. Then it is guaranteed that, if the background process has been applied for one connection in the window where the previous cell arrived or in the window after that window, for the same connection the background process at latest is performed again before the wrap-counting means has reached one of the numbers of these windows again. Hence, every cell arrival constellation is treated fair.

If the artificial second arrival time lies one wrap event after the first arrival time and the theoretical arrival time, and/or if the artificial second arrival time lies two or more wrap events after or at least one wrap event before the first arrival time and the theoretical arrival time and/or if the artificial second arrival time lies one or more wrap events after the theoretical arrival time which lies one wrap event after the first arrival time, a type of situation has occurred in which the TAT is no longer valid such that the arrival time of the next arriving cell need not be compared with that TAT. Therefore, the validity flag can be reset which makes clear that the TAT shall not be used for comparison, or that the comparison may be performed but its result will not be used. The classification of the various constellations of the first arrival time, the second arrival time and the TAT provides a basis for a simple case-determining scheme which simply finds out the current case type which result can be used for the decision whether a comparison of the second arrival time with the TAT makes sense or not. In the above given cases, the comparison can be renounced. The validity flag serves as a sort of one-bit memory for that conclusion.

Upon arrival of the arriving second cell, the validity flag can then be tested on its value. If it is reset, then the arriving second cell can automatically be considered compliant. With this method, the compliance of the arriving second cell can very easily be determined.

Upon arrival of the arriving second cell, if the theoretical arrival time and the second arrival time both lie one wrap event after the first arrival time, and/or if the second arrival time, the first arrival time and the theoretical arrival time are all together not separated by a wrap event, the second arrival time and the theoretical arrival time shall be compared for deciding whether the second arriving cell is considered compliant or non-compliant. The comparison is performed with a reset carry flag, or without using the carry flag. The carry flag is set when the time-counting means has a wrap.

Upon arrival of the arriving second cell, if the theoretical arrival time lies one wrap event after the first arrival time and the second arrival time, the second arrival time and the theoretical arrival time may be compared for deciding whether the second arriving cell is considered compliant or non-compliant. Therefor, again the carry flag should be used. This carry flag shall be reset every time, when a cell has been handled, i.e. it has been decided on its compliance.

Upon arrival of the arriving second cell, if the second arrival time lies one wrap event after the first arrival time and the theoretical arrival time, and/or if the second arrival time lies two or more wrap events after or at least one wrap event before the first arrival time and the theoretical arrival time and/or if the second arrival time lies one or more wrap events after the theoretical arrival time which lies one wrap event after the first arrival time, the arriving second cell can be considered compliant. Again, a simple case determination simplifies the process of cell-handling in that it recognizes the constellation of times. This process on one hand is faster than a process which uses a comparison procedure and on the other hand is fairer because the risk of mistreatment is reduced or even avoided totally.

SUMMARY OF THE INVENTION

The period of time which the time counter, hereinafter called time-counting means, can count without having a wrap is hereinafter called a window.

A window counting means is used which counts the number of wraps. Hence, the actual real time can be modeled more exactly by using the actual time-counting means state and the window counting means state. However, also the window counting means has a limited range and a wrap would again result in wrong GCRA cell handling. The window counting means is more or less only a prolonged time-counting means. The prolonged time can be used to run a background process which determines the situation in that it tests the validity of the theoretical arrival time TAT for the next expected cell.

This is accomplished in that the background process simulates the arrival of a cell for each connection sequentially and determines the validity of the TAT but does not run a GCRA process which would be performed if a real cell arrived.

BRIEF DESCRIPTION OF THE DRAWINGS

Examples of the invention are depicted in the drawings and described in detail below by way of example. It is shown in FIGS. 1a to 1i time schedules of different arrival situations of cells at an input port of a switch, FIG. 2 a cross chart with the different steps to be carried out in the situations of FIGS. 1a to 1i.

DETAILED DESCRIPTION OF THE PREFERRED EMBODIMENTS INVENTION

Figure 3:
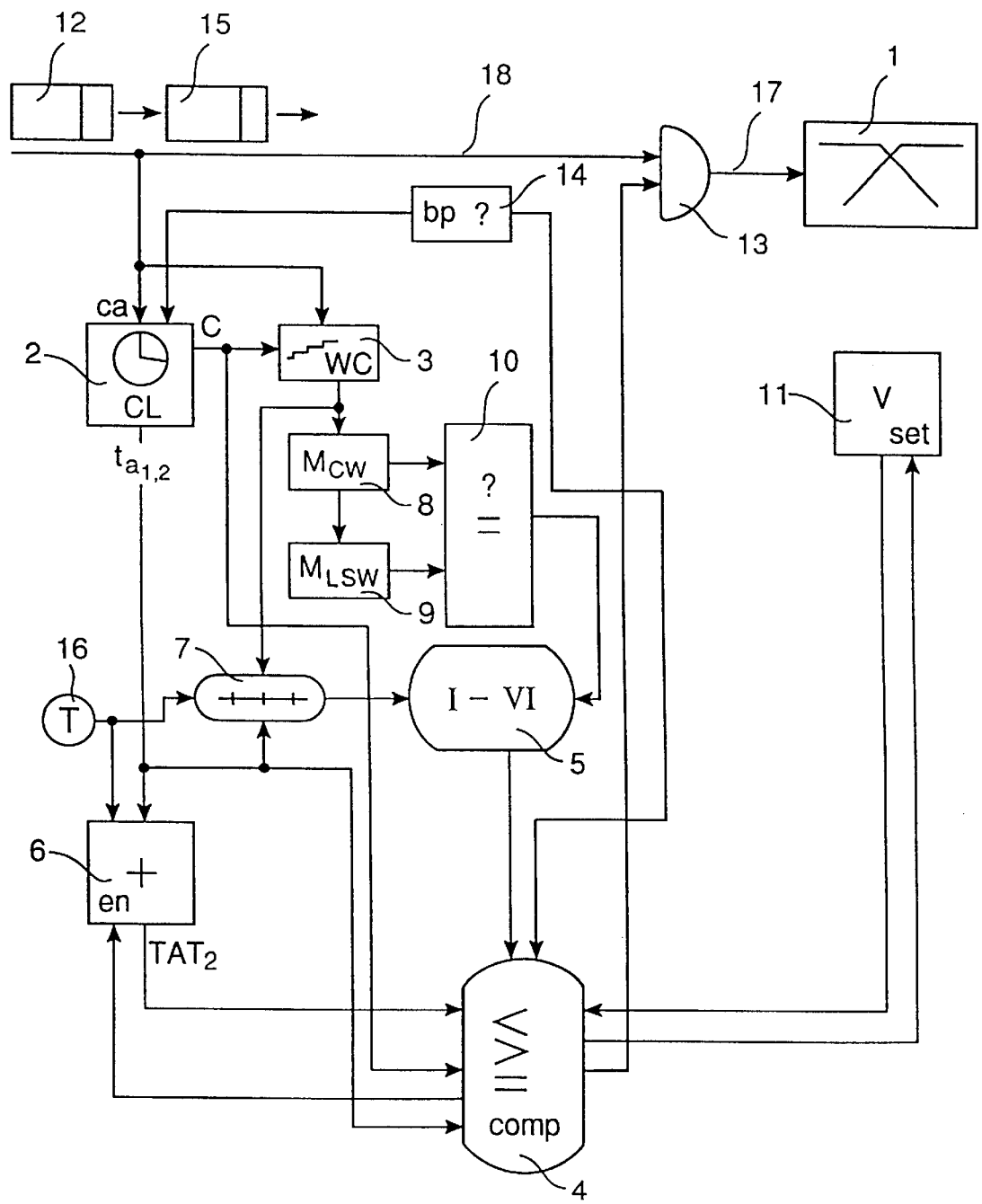
FIG. 3 a block diagram of an apparatus for deciding over the compliance of cells at an input port of a switch All the figures are for sake of clarity not shown in real dimensions, nor are the relations between the dimensions shown in a realistic scale.

In the following, the various exemplary embodiments of the invention are described. For the sake of simplicity, a simple case of GCRA is used in the following description. However, the invented method and apparatus also function with the full GCRA.

At an input of a switching device, several cells are arriving. As cell shall herein be meant a fixed-length packet containing information which comprises destination information about the target the cell is heading for and a payload information which is to be carried to the target. Since the switching device is limited in its capacity to forward the arriving cells to their destinations, the number of cells which can be handled at an input per time unit is also limited. A maximum cell rate or peak cell rate is defined which the switching device can handle. The maximum cell rate is also called the allocated bandwidth of that input, respectively the preceding connection line. If the number of arriving cells exceeds the maximum cell rate, a risk of loosing information of cells exists. Hence, the cell rate at an input needs to be monitored in order to create a signal which can be used to signal a user who sends cells along the monitored connection line that his actually used bandwidth exceeds the allocated bandwidth or that the cell is discarded. As a monitoring mechanism, the time between two arriving cells is measured and compared to a time period, which is a minimum interarrival time period and is calculated from the peak cell rate. If the interarrival time period is bigger than the minimum time period, the cell is considered compliant and can be accepted, otherwise it is considered non-compliant and may be discarded.

A cell is with other words considered non-compliant if it arrives too early. Therefor, a time frame is established which is started when a first cell arrives. This frame has a predetermined length, namely the duration of the interarrival time period T. The arrival time of a cell is $t_a$. The TAT (theoretical arrival time) of a second cell is calculated from the arrival time of a first cell, which has been considered compliant, by adding the TAT to the arrival time of the first cell:

$$TAT_2 = t_{a1} + T$$

If the second cell arrives within this time frame [$t_{a1}$, $TAT_2$], it is considered as non-compliant, otherwise it is considered as compliant. This decision process is called the generic cell-rate algorithm, or short, the GCRA. For initialization of the cell-handling process for one connection, the very first cell is always considered as compliant which is insofar logical as any allocated bandwidth will never be exceeded by the very first cell.

In FIGS. 1a to 1i, time schedules of different arrival situations of cells at an input of a switch are depicted. For all constellations, the following parameters are identical:

The time is counted by a counting means which has a limited counting range. Each counting cycle is starting from 0 and ends when the counter has a wrap. The counting cycles are called windows and are numbered in subsequent order k, k+1, k+2, a.s.o. All windows hence have a constant, equal duration.

A first cell arrives at a first-cell arrival time $t_{a1}$. A second cell arrives at a second-cell arrival time $t_{a2}$.

An interarrival time period has a duration T which is defined to be shorter than one window duration.

A theoretical arrival time $TAT_2$ for the second cell is calculated by adding the interarrival time period duration T to the first-cell arrival time $t_{a1}$: $t_{a1}+T=TAT_2$. Here and in the following examples, this first cell is deemed to be considered as compliant. Therefore, the updating of the theoretical arrival time $TAT_2$ for the second cell after the compliance decision is in these examples be based on the first-cell arrival time $t_{a1}$. For sake of completeness it shall be pointed out that in the case of a non-compliant first cell, the theoretical arrival time $TAT_2$ for the second cell will be calculated with a different formula than the one given above and in FIG. 2. For generalizing the table of FIG. 2, the steps $t_{a1}:=t_{a2}$ and $TAT_2:=t_{a1}+T$ can be substituted by the general step "update TAT if cc". In fact, if the first cell had not been considered compliant, the arrival time of its preceding cell would usually serve as basis for the theoretical arrival time $TAT_2$. The herein described process functions as well for these cases.

The first-cell arrival time $t_{a1}$ lies in a first window k, which is one window before a second window k+1, which again is one window before a third window k+2.

In FIG. 1a, the theoretical arrival time $TAT_2$ for the second cell comes to lie in a window that lies one wrap event after the first window k, the second window k+1. The second-cell arrival time $t_{a2}$ lies also in the second window k+1 and is in that second window k+1 later than the theoretical arrival time $TAT_2$ for the second cell. Since the theoretical arrival time $TAT_2$ for the second cell and the second-cell arrival time $t_{a2}$ lie in the same window, no wrap of the time-counting means disturbs the comparison between these two points in time. The GCRA hence ends in a correct result. The second cell is considered compliant since the theoretical arrival time $TAT_2$ for the second cell is earlier than the second-cell arrival time $t_{a2}$. The second cell is hence handled correctly. This constellation is in the following referred to as case Ia.

In FIG. 1b, the theoretical arrival time $TAT_2$ for the second cell comes to lie in the second window k+1. The second-cell arrival time $t_{a2}$ lies also in the second window k+1 and is earlier than the theoretical arrival time $TAT_2$ for the second cell. Since the theoretical arrival time $TAT_2$ for the second cell and the second-cell arrival time $t_{a2}$ lie in the same window, the wrap of the time-counting means influences both values to be compared to the same extent. The comparison between these two points in time is hence not falsified by the wrap event. The GCRA hence always ends in a correct result. The second cell is here considered as non-compliant since the theoretical arrival time $TAT_2$ for the second cell is bigger than the second-cell arrival time $t_{a2}$. The second cell is hence handled correctly. This constellation is in the following referred to as case Ib.

In FIG. 1c, the theoretical arrival time $TAT_2$ for the second cell comes to lie in the second window k+1. The second-cell arrival time $t_{a2}$ lies in the first window k and is hence earlier than the theoretical arrival time $TAT_2$ for the second cell. This is a typical case, when the second cell is treated wrong. Because during the theoretical arrival time $TAT_2$ for the second cell the time-counting means has had a wrap, the time-counting means compares the second-cell arrival time $t_{a2}$ with a shifted theoretical arrival time $TAT_2'$ for the second cell, which corresponds to the theoretical arrival time $TAT_2$ for the second cell shifted back by one window duration. This shift effects that the shifted theoretical arrival time $TAT_2'$ for the second cell is smaller than the second-cell arrival time $t_{a2}$ although the theoretical arrival time $TAT_2$ for the second cell is bigger, i.e. later, than the second-cell arrival time $t_{a2}$. As result of the GCRA, the second cell is considered compliant although it should be considered as non-compliant. This constellation is in the following referred to as case II. Because the interarrival time period duration T is always smaller than one window duration, the case that the shifted theoretical arrival time $TAT_2'$ is later than the second-cell arrival time $t_{a2}$ is not possible.

In FIG. 1d, the theoretical arrival time $TAT_2$ for the second cell comes to lie in the first window k. The second-cell arrival time $t_{a2}$ lies in the second window k+1 and is hence later than the theoretical arrival time $TAT_2$ for the second cell. This is another case, when the second cell is treated incorrectly. Because between the first-cell arrival time $t_{a1}$ and the second-cell arrival time $t_{a2}$ the time-counting means has had a wrap, the time-counting means compares the second-cell arrival time $t_{a2}$ with a shifted theoretical arrival time $TAT_2'$ for the second cell, which corresponds to the theoretical arrival time $TAT_2$ for the second cell shifted forward by one window duration. This shift effects that the shifted theoretical arrival time $TAT_2'$ for the second cell is bigger than the second-cell arrival time $t_{a2}$ although the theoretical arrival time $TAT_2$ for the second cell is smaller than the second-cell arrival time $t_{a2}$. As result of the GCRA, the second cell is considered non-compliant although it should be considered compliant. This constellation is in the following referred to as case IIIa.

A similar situation comes up when the second-cell arrival time $t_{a2}$ lies in the third window k+2 or any subsequent window k+n, n,∈[3, ∞] and when the shift of the theoretical arrival time $TAT_2$ for the second cell into the respective window wherein the second-cell arrival time $t_{a2}$ lies, effects that the shifted theoretical arrival time $TAT_2'$ for the second cell is bigger than the second-cell arrival time $t_{a2}$ although the theoretical arrival time $TAT_2$ for the second cell is smaller than the second-cell arrival time $t_{a2}$. As result of the GCRA, the second cell is considered non-compliant although it should be considered compliant. This case is depicted in FIG. 1h.

In FIG. 1e, the theoretical arrival time $TAT_2$ for the second cell comes to lie in the first window k. The second-cell arrival time $t_{a2}$ lies in the second window k+1 and is hence later than the theoretical arrival time $TAT_2$ for the second cell. Because between the first-cell arrival time $t_{a1}$ and the second-cell arrival time $t_{a2}$ the time-counting means has had a wrap, the time-counting means compares the second-cell arrival time $t_{a2}$ with a shifted theoretical arrival time $TAT_2'$ for the second cell, which corresponds to the theoretical arrival time $TAT_2$ for the second cell shifted forward by one window duration. In this particular case, the second-cell arrival time $t_{a2}$ is bigger than the theoretical arrival time $TAT_2$ for the second cell and is also bigger than the shifted theoretical arrival time $TAT_2'$ for the second cell. The second cell is considered compliant as it should be. Hence, the shift has no negative effect on the GCRA result. This constellation is in the following referred to as case IIIb.

A similar situation comes up when the second-cell arrival time $t_{a2}$ lies in the third window k+2 or any subsequent window k+n, n,∈[3, ∞] and when the shift of the theoretical arrival time $TAT_2$ for the second cell into the respective window wherein the second-cell arrival time $t_{a2}$ lies, has the effect that the shifted theoretical arrival time $TAT_2'$ for the second cell is also smaller than the second-cell arrival time $t_{a2}$ as well as the theoretical arrival time $TAT_2$ for the second cell is smaller than the second-cell arrival time $t_{a2}$. As result of the GCRA, the second cell is correctly considered compliant. For the treatment of cells according to the invention, this case may be classified under case IIIb.

In FIG. 1f, the theoretical arrival time $TAT_2$ for the second cell comes to lie in the first window k. The second-cell arrival time $t_{a2}$ lies also in the first window k and is earlier than the theoretical arrival time $TAT_2$ for the second cell. Since the theoretical arrival time $TAT_2$ for the second cell and the second-cell arrival time $t_{a2}$ lie in the same window, no wrap of the time-counting means disturbs the comparison between these two points in time. The GCRA hence ends in a correct result. The second cell is considered non-compliant since the theoretical arrival time $TAT_2$ for the second cell is bigger than the second-cell arrival time $t_{a2}$. This constellation is in the following referred to as case IVa.

In FIG. 1g, the theoretical arrival time $TAT_2$ for the second cell comes to lie in the first window k. The second-cell arrival time $t_{a2}$ lies also in the first window k and is later than the theoretical arrival time $TAT_2$ for the second cell. Since the theoretical arrival time $TAT_2$ for the second cell and the second-cell arrival time $t_{a2}$ lie in the same window, no wrap of the time-counting means disturbs the comparison between these two points in time. The GCRA hence ends in a correct result. The second cell is considered compliant since the theoretical arrival time $TAT_2$ for the second cell is smaller than the second-cell arrival time $t_{a2}$. This constellation is in the following referred to as case IVb.

In FIG. 1h, the theoretical arrival time $TAT_2$ for the second cell comes to lie in the first window k. The second-cell arrival time $t_{a2}$ lies in the third window k+2 and is hence later than the theoretical arrival time $TAT_2$ for the second cell. This case has already been described above in relation with FIG. 1d. This constellation is in the following referred to as case V.

In FIG. 1i, the theoretical arrival time $TAT_2$ for the second cell comes to lie in the second window k+1. The second-cell arrival time $t_{a2}$ lies in the third window k+2 and is hence later than the theoretical arrival time $TAT_2$ for the second cell. This is another case, when the second cell is treated incorrectly. Because between the first-cell arrival time $t_{a1}$ and the second-cell arrival time $t_{a2}$ the time-counting means has had even two wraps, the time-counting means compares the second-cell arrival time $t_{a2}$ with a shifted theoretical arrival time $TAT_2'$ for the second cell, which corresponds to the theoretical arrival time $TAT_2$ for the second cell shifted forward by two window durations. This shift effects that the shifted theoretical arrival time $TAT_2'$ for the second cell is bigger than the second-cell arrival time $t_{a2}$ although the theoretical arrival time $TAT_2$ for the second cell is smaller than the second-cell arrival time $t_{a2}$. As result of the GCRA, the second cell is considered non-compliant although it should be considered compliant. This constellation is in the following referred to as case VI.

Not depicted is the case, when the theoretical arrival time $TAT_2$ for the second cell comes to lie in the second window k+1. The second-cell arrival time $t_{a2}$ lies in the third window k+2 and is hence later than the theoretical arrival time $TAT_2$ for the second cell. Between the first-cell arrival time tat and the second-cell arrival time $t_{a2}$ the time-counting means has had two wraps and the time-counting means compares the second-cell arrival time $t_{a2}$ with a shifted theoretical arrival time $TAT_2'$ for the second cell, which corresponds to the theoretical arrival time $TAT_2$ for the second cell shifted forward by two window durations. The second-cell arrival time $t_{a2}$ lies such that the shift effects that the shifted theoretical arrival time $TAT_2'$ for the second cell is smaller than the second-cell arrival time $t_{a2}$ as well as the theoretical arrival time $TAT_2$ for the second cell is smaller than the second-cell arrival time $t_{a2}$. As result of the GCRA, the second cell is considered compliant as it should be. For the treatment of cells according to the invention, this case may be classified under case IIIb.

As can be seen from the above overview, there exist cases, when cells are mistreated. Such mistreatment leads to a wrong signalling towards the users who send these cells, or to an incorrect discard/accept behavior. If cells are accepted, although they should be discarded, the user is granted a bigger bandwidth than he should have and pays for. This further leads to an overload of the switch element which can lead to cell loss on other correctly behaving connections. On the other hand, if cells are discarded although they should be accepted, cells from a correctly behaving user are incorrectly discarded and the user is treated as if he used a too high bandwidth and may be charged with additional costs due to exceeding the allocated bandwidth.

In FIG. 2 a cross-chart is depicted which shows the principal functions to be carried out to handle the arriving cells. The content will be described in subsequence to the description of FIG. 3.

In FIG. 3 an arrangement is depicted which is suited to handle arriving cells according to the principles set forth above.

An arriving first cell 15 is coming in via a connection line 18 and is heading via a first decision means 13 towards an input 17 of a switching device 1. It is to be followed by an arriving second cell 12. Herein, "first" and "second" cell 12, 15 does not exclusively mean the very first and very second cells 12, 15 on that connection line 18, but any pair of cells whereby one cell follows the other.

The connection line 18 is connected to a time-counting means 2, the first decision means 13 and a wrap-counting means 3. The first decision means 13 has an output which is connected to the input 17. The time-counting means 2 is connected with one output to the wrap-counting means 3 and a first comparison means 4 and with a second output to a time-calculating means 6 and in parallel again to the first comparison means 4 and in parallel to a first determination means 7, and has an input coming from a state-determination means 14. The time-calculating means 6 is connected with one output to the first comparison means 4. The first comparison means 4 has also an output connected to an input of the time-calculating means 6. The wrap-counting means 3 has a connection to the first determination means 7 which is connected to a second determination means 5, from which the first comparison means 4 receives one Line while it receives another line from the state-determination means 14. In series with the wrap-counting means 3 a first memory means 8 and a second memory means 9 are arranged, which each are prearranged to a second comparison means 10 whose only output is connected to the second determination means 5. Between a validity flag memory means 11 and the first comparison means 4 two antidirectional lines are arranged. The first comparison means 4 has an output line which leads to the first decision means 13. An interarrival time period memory means 16 is connected to the first determination means 7 and also to the time-calculating means 6.

The arrival of the arriving first cell 15 triggers a process in the time-counting means 2 which reads the arrival time $t_a$ of the arriving first cell 15 and delivers its value to the time-calculating means 6 and to the first comparison means 4. In the interarrival time period memory means 16, a predetermined value for the interarrival time period T has been stored and is delivered to the time-calculating means 6. In the time-calculating means 6, the theoretical arrival time $TAT_2$ for the arriving second cell 12, is calculated by adding the interarrival time period T from the interarrival time period memory means 16 to the arrival time $t_{a1}$ of the arriving first cell 15. The calculated theoretical arrival time $TAT_2$ for the arriving second cell 12 is however not yet given to the output which is connected to the first comparison means 4.

Assuming that the arriving first cell 15 is a subsequent cell of a previous arriving cell with a previous arrival time $t_{a0}$ in the first comparison means 4, the theoretical arrival time $TAT_1$ of the arriving first cell 15, which has been calculated from the arrival time $t_{a0}$ of the previous arriving cell, is used for the therein to be performed action, namely the comparison of the arrival time $t_{a1}$ of the arriving first cell 15 with the theoretical arrival time $TAT_1$ of the arriving first cell 15. In the same way, in the first comparison means 4 the theoretical arrival time $TAT_2$ of the second cell 12 will be compared with the arrival time $t_{a2}$ of the second arriving cell 12. For the very first cell on the connection line 18, the theoretical arrival time TAT will be initialized with the value 0.

The counter of the wrap-counting means 3 is incremented by every wrap of the time-counting means 2, such that the counter state of the wrap-counting means 3 reflects the number of wraps of the time-counting means 2. Each time, the counting means 3 has a wrap, furthermore a carry flag c is set if it has not been already been set.

The number of wraps is representing the number of the current window and is present at the output of the wrap-counting means 3 where it is used as input for the first determination means 7. The wrap-counting means 3 is triggered by the arrival of the arriving first cell 15 to transfer the current counter state to the first memory means 8 and the first determination means 7. Thus, the content of the first memory means 8 represents the number of the window in which the arriving first cell 15 arrived. When the next cell, the arriving second cell 12, is arriving, the content of the first memory means 8 is shifted to the second memory means 9 such that its content represents the number of the window in which the previous cell, the arriving first cell 15, arrived. The current counter state of the wrap-counting means 3 is upon arrival of the arriving first cell 15 also transferred to the first determination means 7 which hence also gets the number of the window in which the arriving first cell 15 arrived.

The first arrival time $t_{a1}$ of the arriving first cell 15 and the interarrival time period T are used as input for the first determination means 7 wherein therefrom and from the transferred counter state of the wrap-counting means 3 the number of the window in which the theoretical arrival time $TAT_2$ for the next cell, the arriving second cell 12, lies is calculated. If the sum of the arrival time $t_{a1}$ of the arriving first cell 15 and the interarrival time period T is higher than one counter cycle of the counter, then the theoretical arrival time $TAT_2$ for the arriving second cell 12 lies in the window after the window represented by the transferred counter state of the wrap-counting means 3. Otherwise it lies in the window represented by the transferred counter state of the wrap-counting means 3.

In the second comparison means 10, an eventual difference between the contents of the first memory means 8 and the second memory means 9 is assessed, such that it therefrom becomes clear in which window related to the window of the arriving first cell 15 the next cell which arrived, which is the arriving second cell 12, lies.

In the second determination means 5, the information coming from the first determination means 7 and from the second comparison means 10, is combined to find out the case type, herein referred to as I, II, III, IV, V or VI, as defined in FIGS. 1*a* to 1*i*. The result of this test is transferred to the first comparison means 4 which uses additionally the validity flag v from the validity flag memory means 11 to determine the type of action to be performed by the first comparison means 4. The action will then either result in a cell acceptance or a cell discarding. In the case of a very first-cell arrival, the validity flag v is initialized with the value 1, which means that the theoretical arrival time TAT to be used for the very first cell is valid and that the comparison of the arrival time $t_a$ of that very first cell with the theoretical arrival time TAT for that cell can be regarded as correct. The result of the comparison process in the first comparison means 4 is transferred as a flag to the first decision means 13 which serves as a gate that either lets pass the arriving first cell 15 to the switching device 1, or deletes that cell. Depending on the case type and the validity flag v, hence the arriving first cell 15 is either considered as non-compliant or as compliant.

After that action, the validity flag v is set or reset by the first comparison means 4, depending on the case type. Furthermore, the calculated value of the theoretical arrival time $TAT_2$ for the arriving second cell 12 is then transferred from the time-calculating means 6 to the first comparison means 4. This transfer is handled via an enabling signal that is given from the first comparison means 4 to the time-calculating means 6.

The described cell-handling process can not only be started via the arriving first cell 15 but also via the state-determination means 14 which on a regular timely basis initiates that cell-handling process in that it simulates the arrival of a cell, but in fact no cell has arrived. The cell-handling process initiated by the state-determination means 14 is herein referred to as the background process. It differs from the non-background process, i.e cell-handling process in that a cell-handling is not performed, but the assessment of the case type and a thereon depending update of the validity flag v or of the carry flag c is done. The background process hence initiates a process which creates an artificial second arrival time $t_{a2}$.

The state-determination means 14 determines whether the process that is currently running is the real cell-handling process or the background process. The process type is signaled to the first comparison means 4.

In the first comparison means 4, then the actions depicted in FIG. 2 are performed. Here again, the window, in which the arriving first cell 15 arrived is referred to as a first window k and the subsequent window as a second window k+1, the next window as third window k+2 a.s.o.

For the explanation of the cell-handling process, it is first assumed that the validity flag v is initially set to 1.

The case I is the case when the theoretical arrival time $TAT_2$ for the arriving second cell 12 lies in the second window k+1 and the arrival time $t_{a2}$ of that cell 12 lies also in the second window k+1. This means that the carry flag c need not be used for the comparison. Therefor it is here initially reset to 0 and used in the comparison, but can also be left as set to one and be neglected in the comparison and afterwards be reset to 0. Upon cell arrival (ca), the validity flag v is tested and found to be set to 1. Then, the comparison between the theoretical arrival time $TAT_2$ for the arriving second cell 12 and the arrival time $t_{a2}$ of that arriving second cell 12 is performed, using the carry flag c which here is 0. If the arrival time $t_{a2}$ of the arriving second cell 12 is later than the theoretical arrival time $TAT_2$ for the arriving second cell 12, the subcase Ia is present and the arriving second cell 12 will be considered as compliant cell (cc). The validity flag is afterwards set to 1 and the enabling signal from the first comparison means 4 effects that the theoretical arrival time $TAT_2$ which is used for the comparison in the first comparison means 4 is updated for the next cell to arrive ($t_{a1}:=t_{a2}$; $TAT_2=t_{a1}+T$). If the arrival time $t_{a2}$ of the arriving second cell 12 is earlier than the theoretical arrival time $TAT_2$ for the arriving second cell 12 the subcase Ib is present and the arriving second cell 12 will be considered as non-compliant cell. The validity flag v is in any subcase Ia, Ib afterwards updated in that it is set to 1 and the enabling signal from the first comparison means 4 effects that the theoretical arrival time $TAT_2$ which is used for the comparison in the first comparison means 4 is updated for the next cell to arrive ($t_{a1}:=t_{a2}$; $TAT_2:=t_{a1}+T$).

The case II is the case when the theoretical arrival time $TAT_2$ for a arriving second cell 12 lies in the second window k+1 and the arrival time $t_{a2}$ of that arriving second cell 12 lies in the first window k. It becomes obvious that in this case the arriving second cell 12 is always non-compliant. Using the carry flag c which here is set to 1, results in a correct comparison with $TAT_2 > t_a$. This means that the carry flag c must be used for the comparison and shall not be set to 0. Upon cell arrival (ca), the validity flag v is tested and found to be set. Then, the comparison between the theoretical arrival time $TAT_2$ for the arriving second cell 12 and the arrival time $t_{a2}$ of that arriving second cell 12 is performed using the carry flag c, the carry flag c being here set to 1. The arrival time $t_{a2}$ of the arriving second cell 12 is here always earlier than the theoretical arrival time $TAT_2$ for the arriving second cell 12 and the arriving second cell 12 will be considered as non-compliant cell. The validity flag v is afterwards set to 1 and the enabling signal from the first comparison means 4 effects that the theoretical arrival time $TAT_2$ which is used for the comparison in the first comparison means 4 is updated for the next cell to arrive ($t_{a1}:=t_{a2}$; $TAT_2:=t_{a1}+T$). Furthermore the carry flag c is finally reset to 0.

The case III is the case when the theoretical arrival time $TAT_2$ for a arriving second cell 12 lies in the first window k and the arrival time $t_{a2}$ of that arriving second cell 12 lies in the second window k+1. It becomes obvious that in this case the arriving second cell 12 is always compliant. No comparison need be performed. Since the arriving second cell 12 is considered as compliant in either case, validity flag v=1 or validity flag v=0, no test for the status of the validity flag v need be performed. Upon cell arrival (ca), the arriving second cell 12 will be directly considered as compliant cell. The validity flag v is afterwards updated, i.e. set to 1 and the enabling signal from the first comparison means 4 effects that the theoretical arrival time $TAT_2$ which is used for the comparison in the first comparison means 4 is updated for the next cell to arrive ($t_{a1}:=t_{a2}$; $TAT_2:=t_{a1}+T$).

The case IV is the case when the theoretical arrival time $TAT_2$ for a arriving second cell 12 lies in the first window k and the arrival time $t_{a2}$ of that arriving second cell 12 lies also in the first window k. This means that the carry flag c has not been set because no wrap occurred. The carry flag c can be used for the comparison and has no influence. Upon cell arrival (ca), the validity flag v is tested and found to be set to 1. Then, the comparison between the theoretical arrival time $TAT_2$ for the arriving second cell 12 and the arrival time $t_{a2}$ of that arriving second cell 12 is performed, using the carry flag c which here is 0. If the arrival time $t_{a2}$ of the arriving second cell 12 is later than the theoretical arrival time $TAT_2$ for the arriving second cell 12 the subcase IVb is present and the arriving second cell 12 will be considered as compliant cell (cc) The validity flag v is afterwards set to 1 and the enabling signal from the first comparison means 4 effects that the theoretical arrival time $TAT_2$ which is used for the comparison in the first comparison means 4 is updated for the next cell to arrive ($t_{a1}:=t_{a2}$; $TAT_2=t_{a1}+T$). If the arrival time $t_{a2}$ of the arriving second cell 12 is earlier than the theoretical arrival time $TAT_2$ for the arriving second cell 12 the subcase IVa is present and the arriving second cell 12 will be considered as non-compliant cell. The validity flag v is afterwards set to 1 and the enabling signal from the first comparison means 4 effects that the theoretical arrival time $TAT_2$ which is used for the comparison in the first comparison means 4 is updated for the next cell to arrive ($t_{a1}:=t_{a2}$; $TAT_2:=t_{a1}+T$).

The case V is the case when the theoretical arrival time $TAT_2$ for a arriving second cell 12 lies in the first window k and the arrival time $t_{a2}$ of that arriving second cell 12 lies in the third window k+2 or in a later window k+3, 4, . . . . It becomes obvious that in this case the arriving second cell 12 is always compliant. No comparison need be performed. Since the arriving second cell 12 is considered as compliant in either case, validity flag v=1 and validity flag v=0, no test for the status of the validity flag v need be performed. Upon cell arrival (ca), the arriving second cell 12 will be directly considered as compliant cell. The validity flag v is afterwards set to 1 and the enabling signal from the first comparison means 4 effects that the theoretical arrival time $TAT_2$ which is used for the comparison in the first comparison means 4 is updated for the next cell to arrive ($t_{a1}$:+$t_{a2}$; $TAT_2$:=$t_{a1}$+T).

The case VI is the case when the theoretical arrival time $TAT_2$ for a arriving second cell 12 lies in the second window k+1 and the arrival time $t_{a2}$ of that arriving second cell 12 lies in the third window k+2 or in a later window k+3, 4, . . . . This case is similar to case V, i.e. the arriving second cell 12 is always compliant. No comparison need be performed. Since the arriving second cell 12 is considered as compliant in either case, validity flag v=1 and validity flag v=0, no test for the status of the validity flag v need be performed. Upon cell arrival (ca), the arriving second cell 12 will be directly considered as compliant. The validity flag v is afterwards set to 1 and the enabling signal from the first comparison means 4 effects that the theoretical arrival time $TAT_2$ which is used for the comparison in the first comparison means 4 is updated for the next cell to arrive ($t_{a1}$:=$t_{a2}$; $TAT_2$:=$t_{a1}$+T).

For the comparison, hence in some cases, the carry flag c is used. This flag effects that an eventual wrap between the theoretical arrival time $TAT_2$ and the second arrival time $t_{a2}$ is taken into account in their comparison, such that a misinterpretation of their mutual position is excluded.

The above actions result in correct cell-handling, as long as no wrap of the wrap-counting means 3 occurs, because the value of the wrap-counting means 3 increases with time. If, however, the wrap-counting means 3 has a wrap, constellations may occur when the next cell arrives in a window whose dedicated number is smaller than the number of the window in which the preceding cell arrived, although that next cell arrived much later in time.

Therefor, the background process is performed with a minimum repetition rate, respectively maximum repetition period TR. The time period between two initiations of the background process should be by the duration of at least two windows smaller than the time of a counting period of the wrap-counting means 3, the time between two wraps of the wrap-counting means 3. It becomes clear that the timely regularity need not have a constant periodicity but can vary in time as long as it does not exceed the above described limit of two windows below the maximum number of windows which can be counted without a wrap of the wrap-counting means 3.

When the background process is started, the following actions are performed, whereby the artificial second arrival time $t_{a2}$ is used as if it was the second arrival time $t_{a2}$ of a real arriving cell.

In case III, the validity flag v is reset to zero. This means that in any following case I–VI the arriving second cell 12 will be considered as compliant which is correct because for that arriving second cell 12, the theoretical arrival time $TAT_2$ will always be earlier than its arrival time $t_{a2}$.

In case V, the validity flag v is reset to zero. This means that in any following case I–VI the arriving second cell 12 will be considered as compliant which is correct because for that arriving second cell 12, the theoretical arrival time $TAT_2$ will always be earlier than its arrival time $t_{a2}$.

In case VI, the validity flag v is reset to zero. This means that in any following case I–VI the arriving second cell 12 will be considered as compliant which is correct because for that arriving second cell 12, the theoretical arrival time $TAT_2$ will always be earlier than its arrival time $t_{a2}$.

In case I, the carry flag c is reset to 0. The theoretical arrival time $TAT_2$ lies in the same window in which t he background process occurs. The validity of the theoretical arrival time $TAT_2$ is not outdated at the point of time when the background process is performed. The arriving second cell 12 could still arrive in the same widow and hence must be compared with the valid theoretical arrival time $TAT_2$. For a correct assessment of the validity of the theoretical arrival time $TAT_2$ for the arriving second cell 12, if that arriving second cell 12 arrives after a wrap of the wrap-counting means 3 and in the window that has the same number as has the window in which the previous cell, the arriving first cell 15, arrived, or in one window later, hence once again a background process has to be performed. The latest point in time for the background process to be performed again is in consequently the window that precedes the window which has the same number as has the window in which the arriving first cell 15 arrived. If the arriving second cell 12 arrives in any window that is later than the second window k+1 or before the first window k, it will be considered as compliant. This is then case VI. If the arriving second cell 12 arrives in the window that has the same number as has the window in which the arriving first cell 15 arrived, or in one window later, the background process was already performed for case VI which resulted in a reset validity flag v=0 and will upon cell arrival result in a consideration as compliant. Since the carry flag c is reset to 0, in the case when the arriving second cell 12 arrives in the second window k+1 in which lies the theoretical arrival time $TAT_2$, a correct GCRA is performed then.

In case II, nothing is done by the background process. The theoretical arrival time $TAT_2$ lies one window later than the window in which the background process occurs. The validity of the theoretical arrival time $TAT_2$ is at that point of time not outdated. The next arriving second cell 12 could still arrive in the same or in the next window and hence must be compared with the valid theoretical arrival time $TAT_2$. For a correct assessment of the validity of the theoretical arrival time $TAT_2$ for the next arriving second cell 12, if that second cell 12 arrives after a wrap of the wrap-counting means 3 and in the window that has the same number as has the window in which the previous cell, the arriving first cell 15, arrived, or in one window later, hence once again a background process has to be performed at a time which here is then at latest in the window that precedes the window which has the same number as has the window in which the arriving first cell 15 arrived. For the sake of a constant background process periodicity, the latest window will be chosen to be two windows before the window which has the same number as has the window in which the arriving first cell 15 arrived. If the next second cell 12 arrives in any window that is later than the second window k+1 or before the first window k, it will be considered as compliant. This is then again case VI. If the next second cell 12 arrives in the window that has the same number as has the window in which the previous arriving first cell 15 arrived, or in one window later, the background process was already performed for case VI which resulted in a reset validity flag v=0 and will upon cell arrival result in a consideration as compliant. Since the carry flag c is in the case II still 0, in the case when the next arriving second-cell 12 arrives in the second window k+1 in which lies the theoretical arrival time $TAT_2$ or in the preceding first window k, a correct GCRA is performed then.

In case IV, nothing is done by the background process. The theoretical arrival time $TAT_2$ lies in the same window in which the background process occurs. The validity of the theoretical arrival time $TAT_2$ is at that point of time not outdated. The next arriving second cell 12 could still arrive in the same or in the next window and hence must be compared with the valid theoretical arrival time $TAT_2$. For a correct assessment of the validity of the theoretical arrival time $TAT_2$ for the next arriving second cell 12, if that arriving second cell 12 arrives after a wrap of the wrap-counting means 3 and in the window that has the same number as has the window in which the previous arriving first cell 15 arrived, or in one window later, hence once again a background process has to be performed at a time which here is then at latest in the window that precedes the window which has the same number as has the window in which the previous arriving first cell 15 arrived. For the sake of a constant background process periodicity, the latest window will be chosen to be two windows before the window which has the same number as has the window in which the arriving first cell 15 arrived. If the next arriving second cell 12 arrives in any window that is later than the second window k+1 or before the first window k, it will be considered as compliant. This is then case V. If the next arriving second cell 12 arrives in the window that has the same number as has the window in which the previous arriving first cell 15 arrived, or in one window later, the background process was already performed for case V which resulted in a reset validity flag v=0 and will upon cell arrival result in a consideration as compliant. Since the carry flag c is in the case IV still 0, in the case when the next arriving second cell 12 arrives in the second window k+1 in which lies the theoretical arrival time $TAT_2$ or in the preceding first window k, a correct GCRA is performed then.

Since the wrap-counting means (3) also has a limited counting range, the case is possible that the second arrival time $t_{a2}$ lies in a window whose number is lower than the window in which the first arrival time $t_{a1}$ lies. In FIG. 2, this case is unified with case V and VI, because the resulting procedure is identical. The arriving second cell 12 will be considered as compliant, since it is obvious that a wrap of the wrap-counting means (3) must have occurred to lead to this situation. The background process can therefore at latest occur in the window whose number is right before the number of the window in which the first arrival time $t_{a1}$ lies.

The decision process in the first comparison means 4 can be realized in form of the following program steps which are performed each time the arrival time $t_a$ is updated in the first comparison means 4:

if bp=0 then
  if windownumber($TAT_2$)=k+1 and windownumber ($t_{a2}$)=k+1 then c=0
  if v=1 then
    if windownumber($TAT_2$)=k and windownumber ($t_{a2}$)=k+1 then cc
    else comp ($t_{a2}$, $TAT_2$ & c)
  else cc
v=1
if windownumber($TAT_2$)=k+1 and windownumber ($t_{a2}$)=k then c=0
if cc then $t_{a1}$:=$t_{a2}$
  $TAT_2$:=$t_{a1}$+T
else if windownumber($TAT_2$)=k+1 and windownumber ($t_{a2}$)=k+1 then c=0
  else if windownumber($TAT_2$)≠k and windownumber ($t_{a2}$)≠k then v=0

The size of the wrap-counting means 3, i.e. its maximum reading, is ideally chosen when the state-determination means 14 has enough time to perform the background process at least with its minimum repetition rate, respectively maximum repetition period, for every present connection, within one cycle of the wrap-counting means 3. Choosing that size as low as possible will of course keep the needed chip area for the wrap-counting means 3 as low as possible and hence reduces the total needed chip area and with it the prize of the apparatus.

It is to be noted that the background process can be renounced for a connection if the cell traffic on that connection fulfils the condition of a certain minimum value and a certain uniformity. If for example, it is guaranteed that the maximum interarrival time between two cells on that connection is smaller than the duration of a window multiplied by the by 2 reduced maximum reading of the wrap-counting means 3, the background process is obsolete. With other words, no background process is needed, when in the time between the beginning if the third window k+2 and the beginning of the first window k after one wrap of the wrap-counting means 3 at least the second cell 12 is arriving.

Generally, depending on the result whether the cell is considered compliant or non-compliant, the most logical action is to discard non-compliant cells and to accept compliant cells. This behavior has been used in the before described embodiments. However, there may be additional aspects which can influence this cell-handling decision and which can lead to a more generous cell acceptance wherein even some non-compliant cells are accepted or to a more restrictive cell-acceptance, wherein even some compliant cells are discarded. In any case, also these cell-handling routines are heavily relying on an accurate cell compliance determination. As switching device preferably an ATM switch can be used, in which case the cells are ATM cells.

What is claimed is:

1. An apparatus for deciding on the compliance of cells at an input of a switch comprising time-counting means (2) with a predetermined maximum counting range, whose reading determines for an arriving first cell (15) a first arrival time ($t_{a1}$) and for an arriving second cell (12) a second arrival time ($t_{a2}$) which is compared by first comparison means (4) with a theoretical arrival time ($TAT_2$) for said second cell (12), said theoretical arrival time ($TAT_2$) being calculated in time-calculating means (6) using said first arrival time ($t_{a1}$) and a predetermined value of an interarrival period (T), whereby in said first comparison means (4), depending on the result of said therein performed comparison, it is decided whether said second arriving cell (12) is considered compliant (cc) or non-compliant, wherein said apparatus further comprises wrap-counting means (3) for counting the number of wraps of said time-counting means (2) whose readings at said second arrival time ($t_{a2}$) and at said theoretical arrival time ($TAT_2$) being usable for a determination whether a wrap occurred between said theoretical arrival time ($TAT_2$) and said second arrival time ($t_{a2}$), the result of that determination being usable for the decision whether to use said comparison in said first comparison means (4) for deciding whether said second arriving cell (12) is considered compliant (cc) or non-compliant, or whether to consider said second arriving cell (12) compliant (cc) or non-compliant without performing said comparison; further comprising state-determination means (14) which on a timely regular basis with a predetermined repetition period (TR) initiates a process (bp) which effects an artificial second arrival time ($t_{a2}$) for which the reading of the wrap-counting means (3) is determined, which together with the reading of said wrap-counting means (3) at the theoretical as arrival time ($TAT_2$) is usable for the determination whether a wrap occurred between said theoretical arrival time ($TAT_2$) and said artificial second arrival time ($t_{a2}$), the result of that determination being usable for the decision whether to use said comparison in said first comparison means (4) for deciding whether said second arriving cell (12) is considered compliant (cc) or non-compliant, or whether to consider said second arriving cell (12) compliant (cc) or non-compliant without performing said comparison, and wherein the repetition period (TR) is at maximum the time between two wraps of the time-counting means (2) multiplied with the maximum reading of the wrap-counting means (3) minus 2.

2. The apparatus according to claim 1, further comprising a second comparison means (10) for comparing the reading of said wrap-counting means (3) at the first arrival time ($t_{a1}$) with the reading of said wrap-counting means (3) at the second arrival time ($t_{a2}$).

3. The apparatus according to claim 1, further comprising a first determination means (7) for determining the reading of the wrap-counting means (3) at the theoretical arrival time ($TAT_2$).

4. The apparatus according to claim 1, further comprising first memory means (8) for storing the reading of the time-counting means (2) at the second arrival time ($t_{a2}$) and second memory means (9) for storing the reading of said time-counting means (2) at the first arrival time ($t_{a1}$).

5. The apparatus according to claim 1, wherein the result of the determination whether a wrap occurred between the theoretical arrival time ($TAT_2$) and the artificial second arrival time ($t_{a2}$) is usable for setting a validity flag (v) which is usable for the decision whether to use the comparison for deciding whether the second arriving cell (12) is considered compliant (cc) or non-compliant, or whether to consider said second arriving cell (12) compliant (cc) or non-compliant without performing said comparison.

6. A method for deciding on the compliance of cells at an input of a switch whereby the time is counted with time-counting means (2) with a predetermined maximum counting range, under use of whose reading for an arriving first cell (15) a first arrival time ($t_{a1}$) and for an arriving second cell (12) a second arrival time ($t_{a2}$) is determined which is compared with a theoretical arrival time ($TAT_2$) for said second cell (12), said theoretical arrival time ($TAT_2$) being calculated using said first arrival time ($t_{a1}$) and a predetermined value of an interarrival period (T), whereby depending on the result of said performed comparison, it is decided whether said second arriving cell (12) is considered compliant (cc) or non-compliant, wherein the number of wraps of said time-counting means (2) is counted with wrap-counting means (3), whose readings at said second arrival time ($t_{a2}$) and at said theoretical arrival time ($TAT_2$) are used to determine whether a wrap occurred between said theoretical arrival time ($TAT_2$) and said second arrival time ($t_{a2}$), the result of that determination being used for deciding whether to use said comparison for deciding whether said second arriving cell (12) is considered compliant (cc) or non-compliant, or whether to consider said second arriving cell (12) compliant (cc) or non-compliant without performing said comparison; wherein on a timely regular basis with a predetermined maximum repetition period (TR) a process (bp) is started which effects an artificial second arrival time ($t_{a2}$) for which the reading of the wrap-counting means (3) is determined, which together with the reading of said wrap-counting means (3) at the theoretical arrival time ($TAT_2$) is used for determining whether a wrap occurred between said theoretical arrival time ($TAT_2$) and said artificial second arrival time ($t_{a2}$), the result of that determination being used for deciding whether to use said comparison in said first comparison means (4) for deciding whether said second arriving cell (12) is considered compliant (cc) or non-compliant, or whether to consider said second arriving cell (12) compliant (cc) or non-compliant without performing said comparison and wherein the repetition period (TR) is chosen at maximum the time between two wraps of the time-counting means (2) multiplied with the maximum reading of the wrap-counting means (3) minus 2.

7. The method according to claim 6, wherein the reading of the wrap-counting means (3) at the first arrival time ($t_{a1}$) is compared with the reading of said wrap-counting means (3) at the second arrival time ($t_{a2}$).

8. The method according to claim 6, wherein the reading of the time-counting means (2) at the second arrival time ($t_{a2}$) and at the first arrival time ($t_{a1}$) are stored.

9. The method according to claim 6, wherein the result of the determination whether a wrap occurred between the theoretical arrival time ($TAT_2$) and the artificial second arrival time ($t_{a2}$) is used for setting a validity flag (v) which is used for deciding whether to use the comparison for deciding whether the second arriving cell (12) is considered compliant (cc) or non-compliant, or whether to consider said second arriving cell (12) compliant (cc) or non-compliant without performing said comparison.

10. The method according to claim 9, wherein if (case III) the artificial second arrival time ($t_{a2}$) lies one wrap event after the first arrival time ($t_{a1}$) and the theoretical arrival time ($TAT_2$), and/or if (case V) the artificial second arrival time ($t_{a2}$) lies two or more wrap events after or at least one wrap event before the first arrival time ($t_{a1}$) and the theoretical arrival time ($TAT_2$) and/or if (case VI) the artificial second arrival time ($t_{a2}$) lies one or more wrap events after the theoretical arrival time ($TAT_2$) which lies one wrap event after the first arrival time ($t_{a1}$), the validity flag (v) is reset.

11. The method according to claims 9, wherein upon arrival (ca) of the arriving second cell (12), if the validity flag (v) is reset then said arriving second cell (12) is considered compliant (cc).

12. The method according to claim 9, wherein upon arrival (ca) of the arriving second cell (12), if (case I) the theoretical arrival time ($TAT_2$) and the second arrival time ($t_{a2}$) both lie one wrap event after the first arrival time ($t_{a1}$),and/or if (case IV) the second arrival time ($t_{a2}$), the first arrival time ($t_{a1}$) and the theoretical arrival time ($TAT_2$) are all together not separated by a wrap event, the second arrival time ($t_{a2}$) and the theoretical arrival time ($TAT_2$) are compared for deciding whether the second arriving cell (12) is considered compliant (cc) or non-compliant, using a reset carry flag (c), which is set when the time-counting means (2) has a wrap, or without using said carry flag (c).

13. The method according to claim 9, wherein upon arrival (ca) of the arriving second cell (12), if (case II) the theoretical arrival time ($TAT_2$) lies one wrap event after the first arrival time ($t_{a1}$) and the second arrival time ($t_{a2}$), the second arrival time ($t_{a2}$) and the theoretical arrival time ($TAT_2$) are compared for deciding whether the second arriving cell (12) is considered compliant (cc) or non-compliant, using a carry flag (c) which is set when the time-counting means (2) has a wrap.

14. The method according claim 9, wherein upon arrival (ca) of the arriving second cell (12), if (case III) the second arrival time ($t_{a2}$) lies one wrap event after the first arrival time ($t_{a1}$) and the theoretical arrival time ($TAT_2$), and/or if (case V) the second arrival time ($t_{a2}$) lies two or more wrap events after or at least one wrap event before the first arrival time ($t_{a1}$) and the theoretical arrival time ($TAT_2$) and/or if (case VI) the second arrival time ($t_{a2}$) lies one or more wrap events after the theoretical arrival time ($TAT_2$) which lies one wrap event after the first arrival time ($t_{a1}$), the arriving second cell (12) is considered compliant (cc).

* * * * *